UNITED STATES PATENT OFFICE 2,185,008

DI-ALKYLBENZENOID SULPHIDES AND PROCESS FOR THEIR PRODUCTION

Bruno H. Wojcik, Niagara Falls, N. Y., assignor to Hooker Electrochemical Company, New York, N. Y., a corporation of New York No Drawing. Application December 30, 1937, Serial No. 182,609

8 Claims. (Cl. 260—608)

By the term di-benzenoid alkyl monosulphides and polysulphides I wish to be understood as referring to those compounds of the class in which two alkylbenzenoid ring structures having more than one alkyl group are linked together through one or more alkyl groups by one or more sulphur atoms. Examples of such compounds are di-phenyl dimethyl (dixylyl), di-naphthyl dimethyl and di-anthracyl dimethyl monosulphide and polysulphide, etc.

In co-pending application Serial No. 114,436, filed Dec. 5, 1936, of Babcock, et al., Patent No. 2,185,009 there is disclosed and claimed a new process for production of di-phenyl methyl di-sulphide, commonly known to the art as dibenzyl disulphide, also certain other di-benzenoid alkyl monosulphides and polysulphides not hitherto known. This co-pending application is limited to alkylbenzenoid hydrocarbons having a single alkyl group. The present application has to do with alkylbenzenoid hydrocarbons of more than one alkyl group.

Dibenzyl disulphide is produced by reaction of phenyl methyl chloride, commonly known as benzyl chloride, made by chlorinating toluene, or methyl benzene, in the methyl group, with sodium polysulphide, according to the following reaction:

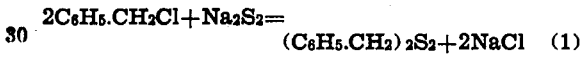

$$2C_6H_5.CH_2Cl + Na_2S_2 = (C_6H_5.CH_2)_2S_2 + 2NaCl \quad (1)$$

As sodium polysulphide is water-soluble and benzyl chloride is insoluble in water but soluble in alcohol, it has heretofore been customary to react these two compounds in an aqueous medium containing alcohol, and preferably ethyl alcohol. The alcohol solution of benzyl chloride is miscible with the water solution of polysulphide. In this way both compounds are brought into liquid phase and intimate contact. The product is a crystalline substance melting at 71° to 72° C., and insoluble in water.

This process is open to the objection that, since the resulting product is slightly soluble in alcohol at ordinary temperatures, when using this process it is necessary to distill off alcohol from the product. This results in a loss of alcohol and also a reduction in yield of the product.

I have discovered and disclosed in the co-pending application that the above reaction can be carried out, with a higher yield, by means of mechanical mixing, in the absence of alcohol or any other solvent for the benzyl chloride, and that the resulting product has improved characteristics as compared with those of the product made in accordance with the prior art. For this purpose the sodium sulphide, together with sulphur in the right proportion to form with it sodium disulphide, is first dissolved in water. The water is preferably at boiling temperature, in which case the solution is subsequently cooled to about 75° C. The benzyl chloride is then added. Being lighter than the polysulphide solution, it tends to form a separate liquid layer above the solution. The benzyl chloride is therefore preferably added gradually, the two liquids being vigorously agitated to bring them into intimate contact. The reaction being exothermic, if desired the temperature of reaction may be controlled by the rate at which the benzyl chloride is added. The preferred temperature of reaction is 75° to 80° C. The reaction is more vigorous if carried out at a temperature of 100° to 110° C., but in that case it is necessary to provide a reflux condenser; also, the resulting product is found to have a chocolate color, whereas the product made at 75° to 80° C. is relatively colorless. When the reaction is substantially complete, the products and liquid medium are allowed to cool, whereupon the dibenzyl disulphide crystallizes out. It may then be readily separated from the aqueous medium containing in solution the sodium chloride produced by the reaction.

The reaction may be carried out in an iron reactor at 75° to 80° C. or thereabouts. Under these conditions the product is darkened by iron sulphide which, however, is found to be in suspension and may be readily filtered out. Reactors of glass or enamel are impracticable for the purpose, as the sodium polysulphide possesses sufficient alkalinity to attack silica.

The alkalinity of the sodium polysulphide results in the production of a small proportion of benzyl alcohol ($C_6H_5.CH_2OH$), which forms a persistent wetting film between the crystals of dibenzyl disulphide. Due to the presence of this benzyl alcohol the melting point of the product is reduced to approximately 65° C. For certain purposes the presence of this benzyl alcohol is of distinct advantage. For example, dibenzyl disulphide, when added to mineral lubricating oils, is found to increase the film strength or load carrying capacity of the oil, but the solubility of dibenzyl disulphide of high purity in lubricating oil is limited. I find, however, that the benzyl alcohol in my product gives it increased solubility in such oils at any given temperature and likewise lowers the temperature at which a given proportion of dibenzyl disulphide will remain in solution in a given oil. This is advantageous, even when the dibenzyl disulphide to be added is within the limit of solubility of the dibenzyl disulphide of the prior art, since it greatly facilitates the operation of incorporating this material with the oil. The increased solubility of my product in lubricating oil, due to the benzyl alcohol, is therefore a valuable characteristic.

I find that the yield of dibenzyl disulphide is affected by the degree of concentration of the reagents in the reaction medium. Thus at relatively low concentrations the proportion of benzyl alcohol formed is greater and the yield of dibenzyl disulphide correspondingly less. The preferred concentrations of the several reagents in the reaction mixture are approximately 7.5 parts of sodium sulphide, 3 parts of sulphur and 16.5 parts of benzyl chloride respectively, to 73 parts of water, by weight. With these concentrations the process just described yields an average of over 95 per cent of the theoretical yield of dibenzyl disulphide.

In my co-pending application I have indicated that products analogous to dibenzyl monosulphide and polysulphide may be made by a similar process from such hydrocarbons as methylnaphthalene, methylanthracene, etc., which have been chlorinated in the methyl group.

I have now discovered that analogous monosulphide and polysulphide products may be made from dimethylbenzenoid hydrocarbons, such as xylene (dimethyl benzene), dimethylnaphthalene, dimethylanthracene, etc., which have been previously chlorinated in one or both methyl groups. If chlorinated in both methyl groups, one or both chlorine atoms may be replaced by sulphur. The reactions in the case of xylene are as follows:

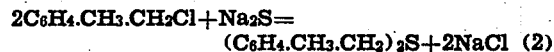
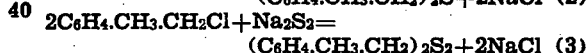
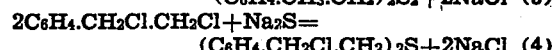
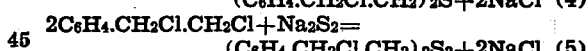
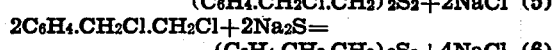
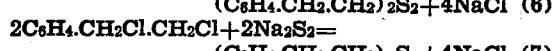

$2C_6H_4.CH_3.CH_2Cl + Na_2S = (C_6H_4.CH_3.CH_2)_2S + 2NaCl$ (2)
$2C_6H_4.CH_3.CH_2Cl + Na_2S_2 = (C_6H_4.CH_3.CH_2)_2S_2 + 2NaCl$ (3)
$2C_6H_4.CH_2Cl.CH_2Cl + Na_2S = (C_6H_4.CH_2Cl.CH_2)_2S + 2NaCl$ (4)
$2C_6H_4.CH_2Cl.CH_2Cl + Na_2S_2 = (C_6H_4.CH_2Cl.CH_2)_2S_2 + 2NaCl$ (5)
$2C_6H_4.CH_2Cl.CH_2Cl + 2Na_2S = (C_6H_4.CH_2.CH_2)_2S_2 + 4NaCl$ (6)
$2C_6H_4.CH_2Cl.CH_2Cl + 2Na_2S_2 = (C_6H_4.CH_2.CH_2)_2S_4 + 4NaCl$ (7)

In Equations 2 and 3 it is assumed that only one methyl group has been chlorinated. In Equations 4 and 5 it is assumed that both methyl groups have been chlorinated but that the chlorine atom of only one group has been replaced by sulphur. In Equations 6 and 7 it is assumed that both methyl groups have been chlorinated and both chlorine atoms replaced by sulphur.

The reactions for dimethylnaphthalene and dimethylanthracene are similar and their equations will be obvious to those skilled in the art.

Reactions 2 and 3 are closely analogous to Reaction 1, the temperature range and other conditions being substantially the same. The products of Reactions 2 to 7, however, are liquids at ordinary temperatures and upon completion of the reaction form a lower layer which is easily separated out from the supernatant brine. The products of Reactions 3, 5 and 7, namely di-phenyl dimethyl disulphide (dixylyl disulphide), diphenyl methyl chloride-methyl disulphide and diphenyl-di-methyl disulphide (dixylyl tetrasulphide), as well as the corresponding polysulphide products made from dimethylnaphthalene and dimethylanthracene, contain in solution a small proportion of the alcohol corresponding to the hydrocarbon radical. The presence of the alcohol is an advantage as it tends to increase the miscibility of the product with mineral oils.

The products made from xylene are especially important because of the cheapness of the raw material and the ease with which it may be chlorinated. The two methyl groups may be in any one of three positions, consequently there are three isomeric xylenes. Commercial xylene consists of a mixture of the three.

The product of Equations 2 to 7 will of course be a mixture of molecules having their two methyl groups in different positions, some of the methyl groups unchlorinated, some chlorinated and retaining their chlorine atoms and others forming double linkage through replacement of chlorine in both methyl groups by sulphur. Since such mixtures generally have a lower melting point and higher solubility in mineral lubricating oil than the pure chemical individuals, they are better adapted for the purpose of increasing the film strength of lubricants than the more expensive pure crystalline products. The mixture produced in this way may be varied by varying the gravity to which the xylene is chlorinated. A typical product made from xylene is produced by chlorinating commercial xylene in the light to a specific gravity of 1.03 at 20° C. and then reacting it with sodium polysulphide, producing a viscous liquid having a specific gravity of 1.12 at 20° C. and miscible with mineral lubricating oils in all proportions. This is accomplished by reacting 240 grams of sodium sulphide crystals ($Na_2S.9H_2O$) with 32 grams of sulphur, 186 grams of the aforesaid xylyl chloride mixture and 350 grams of water at not over 100° C. and preferably between 75° C. and 80° C. The yield of di-xylyl disulphide is 152 grams. As the xylyl chloride used in this reaction is an unfractionated mixture containing some unchlorinated xylene, this corresponds to a yield of well over 90 per cent, based upon the actual xylyl chloride used. It should be noted that these proportions provide a substantial excess of sodium disulphide relative to the xylyl chloride over the one-molecule-to-two proportion called for by Reaction 3. This excess is one of the reasons for the high yield which I obtain.

It is well known that sulphur increases the film strength of lubricating oils. The incorporation of elemental sulphur with lubricating oils, however, presents difficulties and the results are not entirely satisfactory. Sulphur chloride has been used, but the resulting sulpho-chlorinated products are very corrosive to metals. The use of di-benzenoid alkylmonosulphide and disulphide, in which the sulphur is in chemical combination, obviates some of these difficulties, but these products are solids of limited solubility in oils. Therefore I prefer the dimethyl monosulphides and disulphides, which are liquid at ordinary temperatures and of good miscibility with oils.

It is also well known that halogens, and in particular chlorine, are likewise effective in increasing the film strength of lubricants. The products of Reactions 4 and 5, for example, contain chlorine and sulphur in the same molecule. Both these film-strengthening agents may therefore in this way be added to the oil at the same time and their joint effect is thereby secured in a convenient and effective manner.

This product is non-volatile and substantially non-corrosive to metals under ordinary conditions of use.

Obviously, bromine or iodine could be used in place of chlorine, but the latter being cheaper, is on that account generally preferred. Likewise, potassium monosulphide and polysulphide could be used in place of sodium monosulphide and polysulphide, but the latter is preferred on account of its relative cheapness.

Since all the products of this mixture are new, my invention is not limited to the particular process for the products described herein and in the co-pending application referred to, but on the contrary any di-benzenoid polyalkyl monosulphide or polysulphide comes within the scope of my invention, whether made by the process described or by that of the prior art in which alcohol is the medium used.

Since it is possible for a benzenoid ring structure to have attached to it alkyl groups other than methyl groups and to have more than two of them, I do not wish to be limited to methyl groups or to two alkyl groups.

I claim as my invention:

1. The process for production of di-benzenoid polyalkyl compounds in which two polyalkyl benzenoid groups are joined through at least one pair of alkyl groups by at least one sulphur atom which comprises adding a benzenoid polyalkyl halide having a halogen atom in at least one alkyl group to an aqueous solution of a compound of an alkali metal with sulphur having at least one sulphur atom per molecule, with agitation, in the absence of any mutual solvent for the reagents, the rate of such addition being regulated to maintain a reacting temperature but not to cause boiling, allowing the resulting mixture to cool and the product to form a lower layer and mechanically separating the product from the supernatent aqueous medium containing the by-product, in the absence of any solvent extraction medium for the product.

2. The process for production of di-xylyl polysulphides in which two dimethyl phenyl groups are joined through at least one pair of methyl groups by at least two sulphur atoms which comprises reacting a xylyl chloride having a chlorine atom in at least one methyl group with sodium polysulphide, in an aqueous solution, with the aid of mechanical agitation, at not less than 75° C. but below the boiling point of the mixture, in the absence of any mutual solvent for the reagents, allowing the resulting mixture to cool and the product to form a lower layer and mechanically separating the product from the supernatent aqueous medium containing the by-product, in the absence of any solvent extraction medium for the product.

3. The process for production of di-xylyl polysulphides in which two dimethyl phenyl groups are joined through at least one pair of methyl groups by at least two sulphur atoms which comprises reacting a xylyl chloride having a chlorine atom in at least one methyl group with sodium polysulphide, in an aqueous solution, with the aid of mechanical agitation, at 75° to 80° C., in the absence of any mutual solvent for the reagents, allowing the resulting mixture to cool and the product to form a lower layer and mechanically separating the product from the supernatent aqueous medium containing the by-product in the absence of any solvent extraction medium for the product.

4. The process for production of di-xylyl polysulphide containing a small proportion of benzyl alcohol which comprises agitating together substantially 240 parts of sodium sulphide monohydrate, 32 parts of sulphur, 186 parts of xylyl chloride having a specific gravity of 1.03 at 20° C. and 350 parts of water by weight, at substantially 75° to 80° C., allowing the resulting mixture to cool and the product to form a lower layer and mechanically separating the product from the supernatent aqueous medium containing the by-product, in the absence of any solvent extraction medium for the product.

5. The process for production of di-benzenoid polyalkyl compounds in which two polyalkyl benzenoid groups are joined through at least one pair of alkyl groups by at least one sulphur atom which comprises adding a benzenoid polyalkyl halide having a halogen atom in at least one alkyl group to an aqueous solution of a compound of an alkali metal with sulphur having at least one sulphur atom per molecule, with agitation, in the absence of any mutual solvent for the reagents, the rate of such addition being regulated to maintain a reacting temperature but not to cause boiling, allowing the resulting mixture to cool and the product to form a lower layer and separating the product from the supernatent aqueous medium containing the by-product.

6. The process for production of di-xylyl polysulphides in which two dimethyl phenyl groups are joined through at least one pair of methyl groups by at least two sulphur atoms which comprises reacting a xylyl chloride having a chlorine atom in at least one methyl group with sodium polysulphide, in an aqueous solution, with the aid of mechanical agitation, at not less than 75° C. but below the boiling point of the mixture, in the absence of any mutual solvent for the reagents, allowing the resulting mixture to cool and the product to form a lower layer and separating the product from the supernanent aqueous medium containing the by-product.

7. The process for production of di-xylyl polysulphides in which two di-methyl phenyl groups are joined through at least one pair of methyl groups by at least two sulphur atoms which comprises reacting a xylyl chloride having a chlorine atom in at least one methyl group with sodium polysulphide, in an aqueous solution, with the aid of mechanical agitation, at 75° to 80° C., in the absence of any mutual solvent for the reagents, allowing the resulting mixture to cool and the product to form a lower layer and separating the product from the supernatent aqueous medium containing the by-product.

8. The process for production of di-xylyl polysulphide containing a small proportion of benzyl alcohol which comprises agitating together substantially 240 parts of sodium sulphide monohydrate, 32 parts of sulphur, 186 parts of xylyl chloride having a specific gravity of 1.03 at 20° C. and 350 parts of water by weight, at substantially 75° to 80° C., allowing the resulting mixture to cool and the product to form a lower layer and separating the product from the supernatent aqueous medium containing the by-product.

BRUNO H. WOJCIK.